Feb. 14, 1961 P. JARMOTZ ET AL 2,972,117
BALANCED DIFFERENTIAL AMPLIFIER WITH
DIODE IMPEDANCE CHANGING NETWORK
Filed Oct. 14, 1958 2 Sheets-Sheet 1

INVENTORS.
PAUL JARMOTZ
RAYMOND PEPINSKY
BY
Louis B. Applebaum
ATTORNEY

Feb. 14, 1961 P. JARMOTZ ET AL 2,972,117

BALANCED DIFFERENTIAL AMPLIFIER WITH DIODE IMPEDANCE CHANGING NETWORK

Filed Oct. 14, 1958 2 Sheets-Sheet 2

INVENTORS.
PAUL JARMOTZ
RAYMOND PEPINSKY
BY
Louis B. Applebaum
ATTORNEY

United States Patent Office 2,972,117

Patented Feb. 14, 1961

2,972,117

BALANCED DIFFERENTIAL AMPLIFIER WITH DIODE IMPEDANCE CHANGING NETWORK

Paul Jarmotz and Raymond Pepinsky, State College, Pa., assignors, by mesne assignments, to the United States of America as represented by the Secretary of the Navy Filed Oct. 14, 1958, Ser. No. 767,243

11 Claims. (Cl. 331—149)

This invention relates to coincidence circuits and especially to a coincidence circuit which provides a change of impedance from low to high at the time of coincidence of the values of a varying signal and a fixed comparison signal.

Coincidence circuits are well known in the electronics art and are used to indicate the coincidence in time or in numerical value of two or more signals.

A typical embodiment of the present invention comprises a two-tube, balanced differential amplifier circuit containing a pair of criss-crossed diode arms each extending from the plate circuit of one amplifier to the plate circuit of the other. When a condition of balance exists in the amplifiers because of equality in the values of the signals applied to the grid electrodes of the amplifiers, a reverse polarity exists across the diode arms, cutting off conduction therethrough and thus providing a high impedance across each diode. But when the values of the two grid signals are unequal, a condition of imbalance is created in the two amplifiers, one or the other of the diode arms being caused to conduct. A low impedance is thereby provided across each conducting diode.

This change of impedance across the diodes can be utilized as a controlling agent, preferably to control the operation of a blocking oscillator, the latter being designed to provide a pulse of energy when the differential amplifier is balanced by a coincidence of grid-signal values.

An object of this invention is to indicate coincidence in the values of a pair of signals.

Another object is to indicate coincidence or non-coincidence in the values of a pair of signals by a change in the value of an impedance.

A further object is to provide a burst of output energy to indicate coincidence in the values of a pair of signals.

Yet another object is to provide a circuit for indicating the coincidence of value of a varying signal with that of a fixed reference potential.

Other objects and many of the attendant advantages of this invention will be readily appreciated as the same becomes better understood by reference to the following detailed description when considered in connection with the accompanying drawings wherein—

Figure 1:
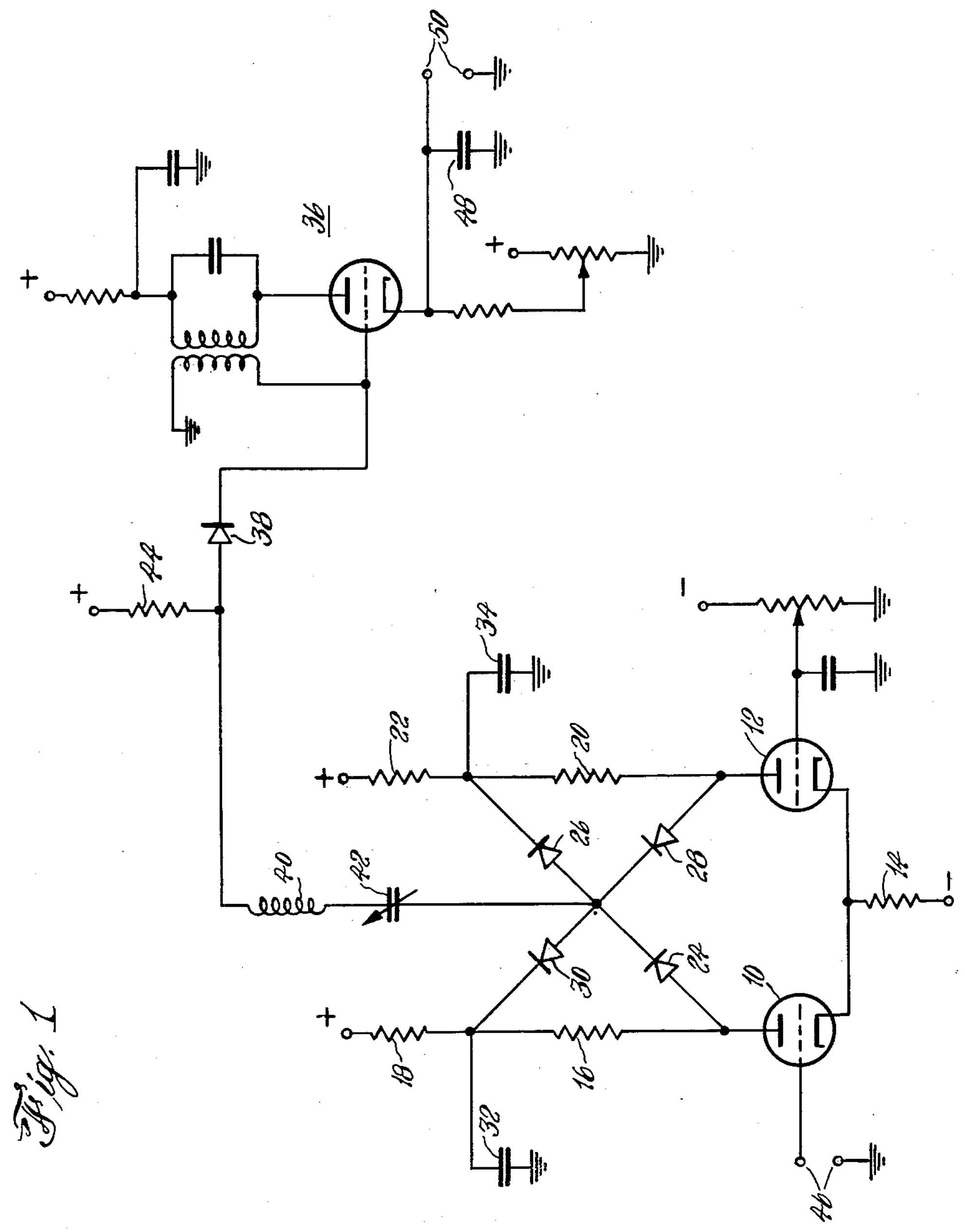
Fig. 1 is a schematic circuit diagram of an embodiment of the invention.

In Fig. 1, cathode coupled triodes 10 and 12 and their associated circuitry comprise a balanced differential amplifier. The triodes 10 and 12 are connected to a source of negative supply voltage through a common cathode resistor 14. Triode 10 is connected to a source of positive supply voltage through series resistors 16 and 18 and triode 12 is similarly connected through resistors 20 and 22. Resistor 16 is equal in value to resistor 20 and resistor 18 is equal to resistor 22.

A pair of diodes 24 and 26 are connected in series, or tandem, from the plate of triode 10 to the junction between resistors 20 and 22, the forward current direction being from the triode plate to the resistor junction. Similarly, a second pair of diodes 28 and 30 are connected from the plate of triode 12 to the junction between resistors 16 and 18. The mid-points of the seriesed-diodes arms, or branches, are joined together. A pair of bypass capacitors 32 and 34 connect the junctions of resistors 16 and 18 and resistors 20 and 22, respectively, to ground.

A conventional oscillator circuit 36 comprising a triode and associated circuitry is connected to the junction at the mid-points of the seriesed-diodes arms of the balanced differential amplifier through a diode 38, an inductance 40 and a variable capacitor 42. A resistor 44 connects the anode of the diode 38 to a source of positive supply voltage.

All diodes are shown as crystals although any type of diode such as vacuum tube diodes may be employed.

In operation, the state of conduction or non-conduction through the seriesed-diodes arms controls the operation of the oscillator 36, the latter being allowed to oscillate only when the voltages on the grids of triodes 10 and 12 are in coincidence.

The input voltage at terminals 46 to the grid of triode 10 may, for example, be a sawtooth voltage, the input to the grid of triode 12 being a fixed D.C. potential derived from a potentiometer across a positive supply voltage, for example. At the conditions of balance, or coincidence of the sawtooth voltage with the D.C. potential, both triodes 10 and 12 are drawing equal currents and the voltage drops across analogous resistors, e.g. 18 and 22, are equal. The diodes 24, 26, 28 and 30 are therefore under reverse polarity and no current flows through them.

When the input sawtooth voltage is below the comparison D.C. potential, triode 10 draws less current than triode 12. The voltage drops through resistors 16 and 18 are smaller than the drops through resistors 20 and 22; therefore, the voltage at the anode of diode 24 will be higher than the voltage at the cathode of diode 26, and the voltage at the cathode of diode 30 will be higher than the voltage at the anode of diode 28. Conduction will take place through diodes 24 and 26.

When the sawtooth voltage is higher than the comparison D.C. potential, voltage conditions cause conduction to occur through diodes 28 and 30.

Conduction through either diode arm connects the grid of the oscillator triode through diode 38, inductance 40 and capacitor 42 to ground through the low incremental resistance of either diode 30 or 26 and either capacitor 32 or 34. This prevents the oscillator circuit 36 from oscillating.

The occurrence of coincidence in the balanced differential amplifier cuts off conduction in both diode arms, open-circuiting the grid of the oscillator from ground and allowing oscillation to begin. After a short period of oscillation, the oscillator blocks itself by developing a voltage across capacitor 48 and across stray capacitance from the grid of the oscillator to ground. The output at the output terminals 50 is thus a positive pulse at the time of coincidence.

Oscillation of the oscillator causes a negative potential to build-up on the stray capacitance existing across the anode of diode 38 to ground. This cuts off conduction in diode 38, thereby uncoupling the diodes 24, 26, 28 and 30 from the oscillator and preventing them from loading the oscillator down. When oscillation is blocked, the diodes take control of the oscillator again. The diodes would not regain control of the oscillator again if the oscillator did not block itself, for once oscillation is initiated, the oscillator overpowers the diodes.

It should be noted here that although a blocking oscillator circuit is illustrated in Fig. 1, any oscillator whose operation may be controlled by means of a change of impedance value such as occurs in the seriesed-diodes arms may be employed in conjunction with the differential amplifier.

Figure 2:
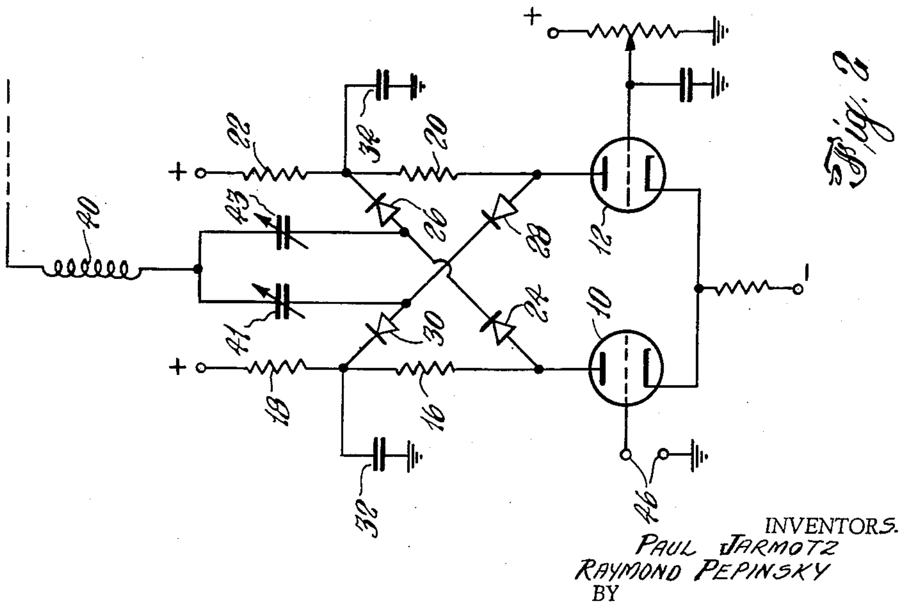
Fig. 2 is a schematic circuit diagram of another embodiment of the invention.

Fig. 2 illustrates another embodiment of the invention. Here the seriesed-diodes arms are not connected together medially and two capacitors 41 and 43 are used in place of the single one 42 employed in Fig. 1. One capacitor 41 is connected to the junction between diodes 28 and 30 and the other 43 is connected to the junction between diodes 24 and 26. When diode arm 24, 26 conducts, the grid of the oscillator is connected to ground through capacitor 43, diode 26 and capacitor 34. When diode arm 28, 30 conducts, the oscillator grid is connected to ground through capacitor 41, diode 30 and capacitor 32. Otherwise, the operation is similar to that of the embodiment of Fig. 1.

Figure 3:
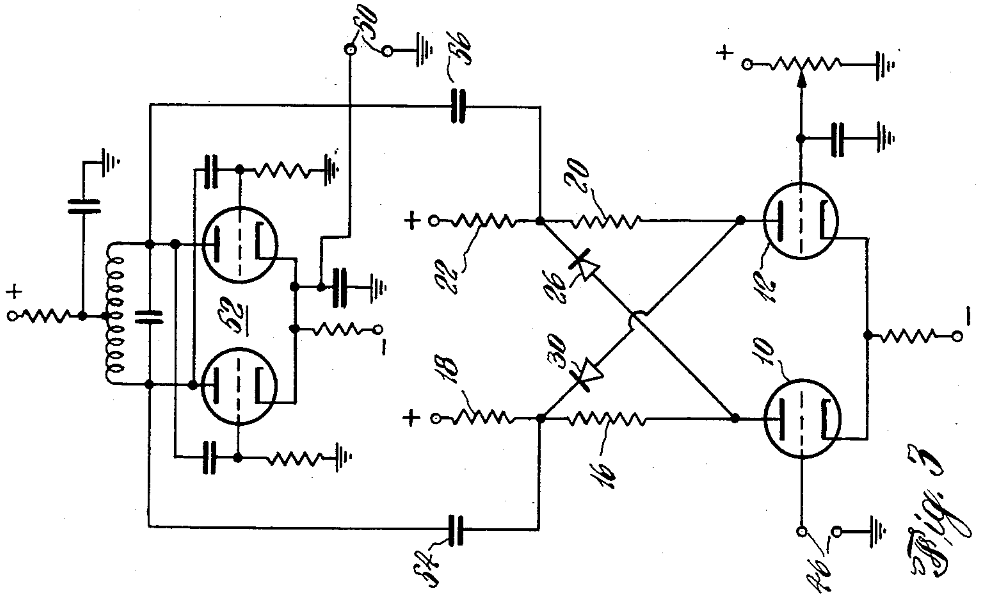
Fig. 3 is a schematic circuit diagram of a third embodiment of the invention.

Fig. 3 shows a third embodiment of the invention. Here either resistor 16 or 20 will load down the tank circuit of the oscillator 52 and prevent it from oscillating when its associated diode is permitted to conduct. Thus, if diode 26 is conducting, a parallel branch to the tank circuit is established through capacitor 54, resistor 16, diode 26 and capacitor 56. If diode 30 is conducting, the parallel branch comprises capacitor 56, resistor 20, diode 30 and capacitor 54.

At the time of coincidence of the grid voltages on triodes 10 and 12, a condition of balance exists and both diodes 26 and 30 have reverse polarities across them so that conduction through both diodes is cut off. The tank circuit loading is therefore removed and the oscillator 52 is permitted to operate.

Obviously many modifications and variations of the present invention are possible in the light of the above teachings. It is therefore to be understood that within the scope of the appended claims the invention may be practiced otherwise than as specifically described.

We claim:

1. A device for providing a high or low impedance in accordance with the state of equality in value of a pair of input signals comprising, in combination: a balanced differential amplifier circuit including a pair of unidirectional current devices, each having an emitter, a collector and a control element; criss-crossed circuit arms, each including at least one unidirectional-current switching device and extending from a point on the collector circuit of one of said unidirectional current devices to a point of different potential on the collector circuit of the other of said unidirectional current devices; connections for a reference potential, the control element of one of said unidirectional current devices being connected thereto; and connections for a varying signal, the control element of the other of said unidirectional current devices being connected thereto, the potentials across both said criss-crossed circuit arms being such as to cut off conduction therein when the varying signal is equal in value to the reference signal and to cause conduction in one said arm when the varying signal is unequal in value to the reference signal, said switching devices providing a low impedance when in the conductive state and a high impedance when in the non-conductive state.

2. A device in accordance with claim 1, wherein said unidirectional current switching devices are diodes.

3. A device in accordance with claim 1, wherein said reference potential is a D.C. potential.

4. A coincidence circuit comprising a device as set forth in claim 2, an oscillator circuit, a pair of capacitances and a network extending from the oscillator to the criss-crossed diode arms, each of said capacitances being connected to a different one of said diode arms, said network, diodes and capacitances forming a pair of paths such that both paths are open-circuited when conduction is cut off in both diode arms, thereby allowing the oscillator to oscillate, and one path presents a low-impedance to the oscillator when its associated diode arm conducts, thereby loading down the oscillator and preventing oscillation.

5. A coincidence circuit comprising a device as set forth in claim 2, a blocking oscillator circuit, a pair of capacitances, and a network extending from the oscillator to the criss-crossed diode arms, each of said capacitances being connected to a different one of said diode arms, said network, diodes and capacitances forming a pair of paths to ground such that both paths are open-circuited when conduction is cut off in both diode arms, thereby allowing the oscillator to oscillate, and one path presents a low impedance from the oscillator to ground when its associated diode arm conducts, thereby loading down the oscillator and preventing oscillation.

6. A coincidence circuit comprising, in combination: a balanced differential amplifier comprising a pair of unidirectional current devices each having at least a collecting element, an emitting element and a control element, connections for a source of negative supply voltage, connections for a source of positive supply voltage, a first impedance connected to both said emitting elements and said negative supply connections, second and third impedances connected in series between the collecting element of one of said unidirectional current devices and said positive supply connections, fourth and fifth impedances equal in value to said second and third impedances, respectively, connected in series between the collecting element of the other of said unidirectional current devices and said positive supply connections, connections for a first signal, one control element being connected thereto, connections for a second signal, the other control element being connected thereto, at least one of said signals being varying in value; and a diode network comprising a pair of arms, each having a a pair of diodes in series, one arm being connected in its forward current direction from the collecting element of said one unidirectional current device to the junction between said fourth and fifth impedances, and the other arm being connected in its forward direction from the collecting element of said other unidirectional current device to the junction between said second and third impedances so that when the values of said first and second signals are equal said diode arms are both under reverse polarity and constitute high impedances while when said first and second signals are unequal in value, one or the other of said diode arms is under forward polarity and constitutes a low impedance.

7. In combination, a device as set forth in claim 6 wherein the mid-points of each diode arm are connected together, a blocking oscillator circuit including a unidirectional current device having a control grid, an inductance and three capacitances, the inductance and one capacitance being connected in series between the control grid of the blocking oscillator and the connection between the mid-points of the diode arms, the second capacitance being connected between ground and the junction of said second and third impedances, and the third capacitance being connected between ground and the connection between said fourth and fifth impedances, said blocking oscillator being referenced to ground potential.

8. In combination, a device as set forth in claim 6, a blocking oscillator circuit including a unidirectional current device having a control grid, an inductance and four capacitances, one end of each of the first two capacitances being connected to a different one of the mid-points of said diode arms and the other ends of each of the first two capacitances being connected through said inductance to the control grid of said oscillator, the third of said capacitances being connected between ground and the junction of said second and third impedances, and the fourth of said capacitances being connected between ground and the junction of said fourth and fifth capacitances, said oscillator being referenced to ground potential.

9. A device for providing a high or low impedance in accordance with the state of equality in value of a pair of input signals comprising, in combination: a balanced differential amplifier circuit including a pair of unidirectional current devices, each having an emitter, collector, and control element and a collector circuit; connections for a reference potential, the control element of one of said unidirectional current devices being connected thereto; connections for a varying signal, the control element of the other of said unidirectional current devices being connected thereto; and a pair of circuit arms, each containing switching means whose states of conduction is alternatively conductive or non-conductive, according to whether a forward or reverse bias exists thereacross, said arms being connected in criss-cross fashion each from a point on the collector circuit of one said unidirectional current device to a point of different potential on the collector circuit of the other said unidirectional current device, a reverse bias existing across said switching means cutting off conduction therethrough when said varying signal is equal in value to said reference signal and a forward bias existing across at least one said switching means permitting conduction therethrough when said varying signal is unequal in value to said reference signal, the impedance of said switching means being high during non-conduction and low during conduction.

10. A device as set forth in claim 9, wherein said arms are connected in balanced criss-cross fashion.

11. A device as set forth in claim 10, wherein said switching means comprises at least one diode.

References Cited in the file of this patent

UNITED STATES PATENTS

| | | |
|---|---|---|
| 2,620,400 | Snijders | Dec. 2, 1952 |
| 2,676,286 | Buchner | Apr. 20, 1954 |
| 2,813,241 | Smith et al. | Nov. 12, 1957 |
| 2,864,954 | Byrne | Dec. 16, 1958 |